Nov. 10, 1953    W. STELZER    2,658,348
BOOSTER BRAKE MECHANISM
Filed March 22, 1950    3 Sheets-Sheet 1
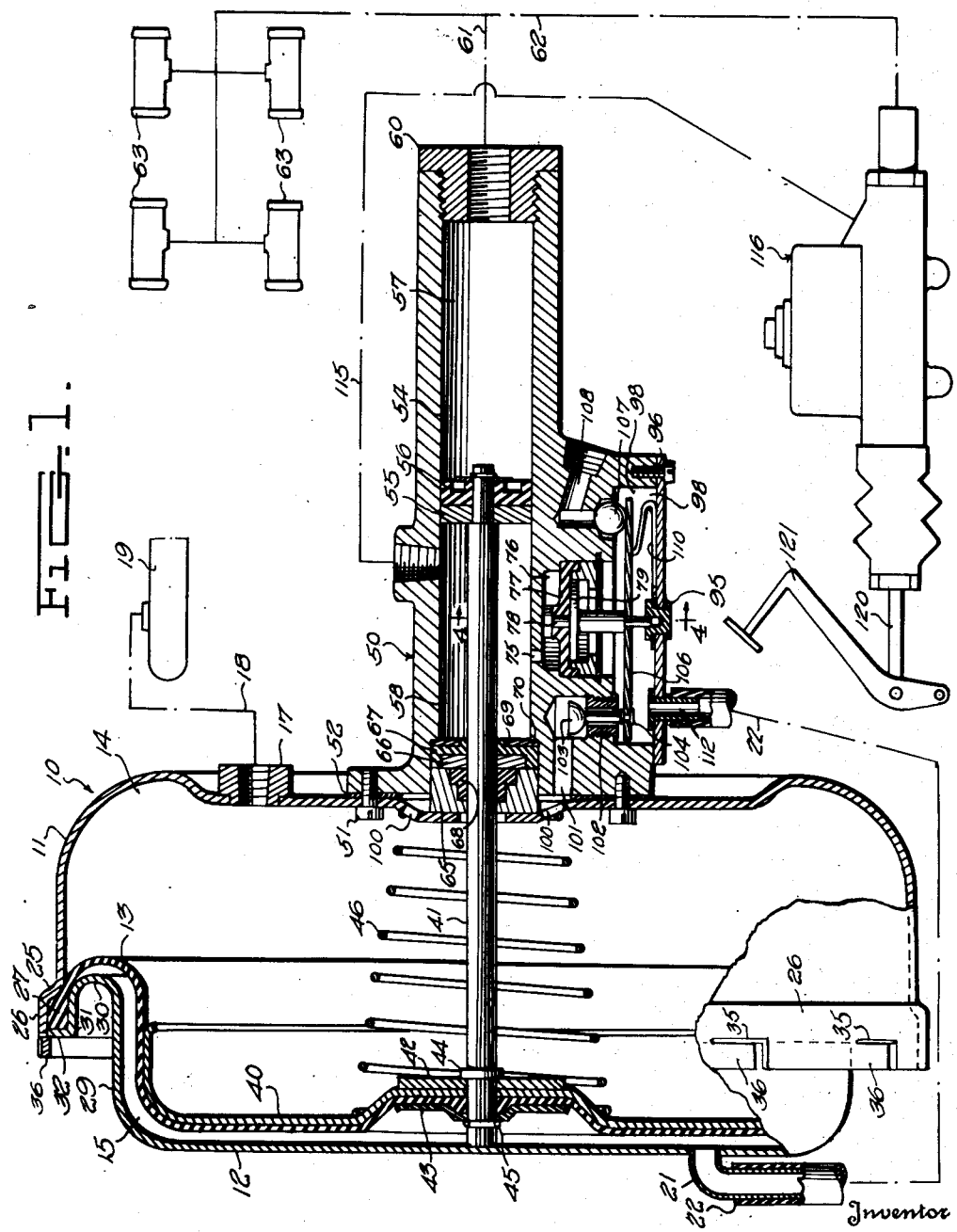
Inventor
WILLIAM STELZER
By
Parker and Walsh. ATTORNEYS

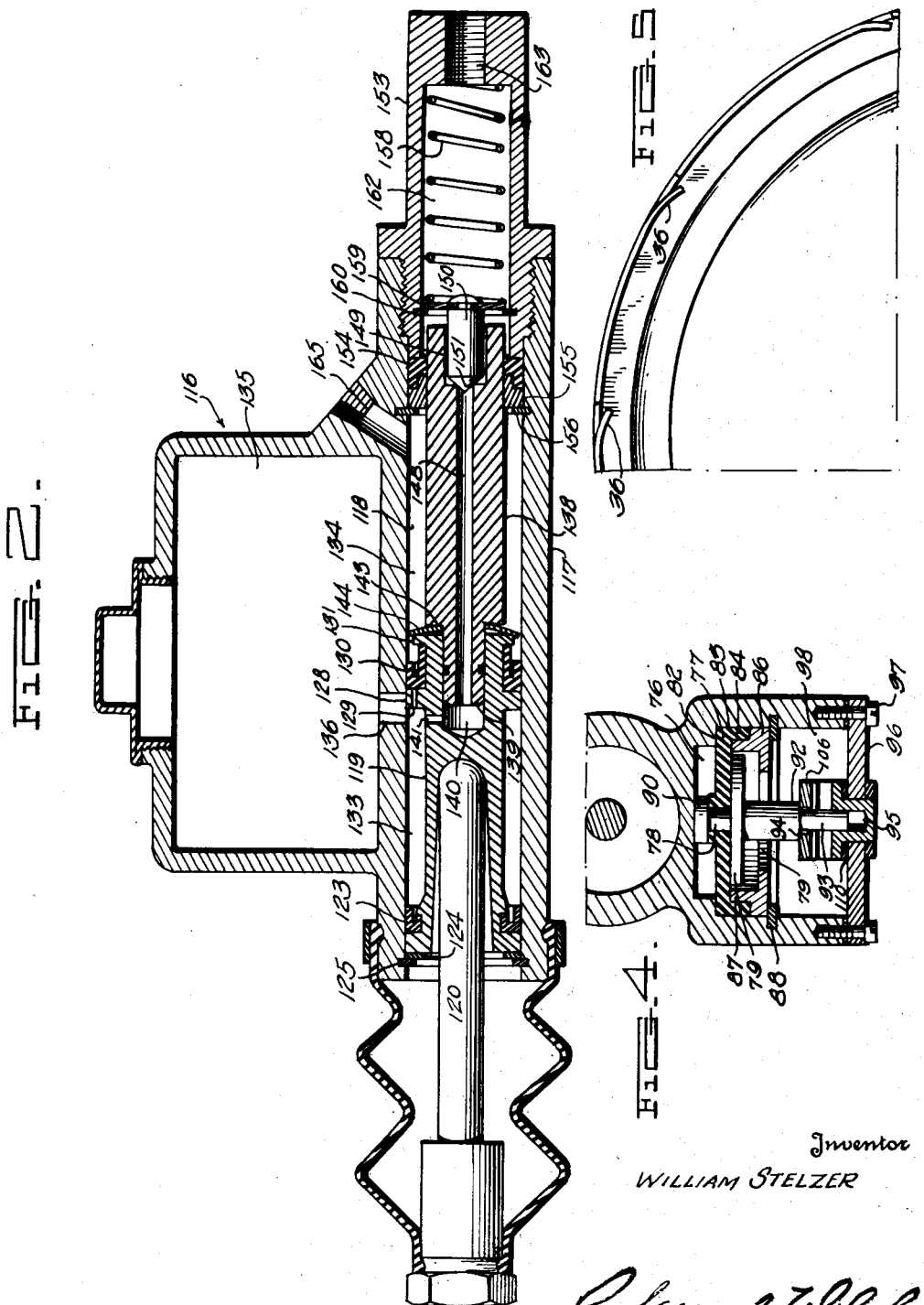

Nov. 10, 1953 W. STELZER 2,658,348
BOOSTER BRAKE MECHANISM
Filed March 22, 1950 3 Sheets-Sheet 3
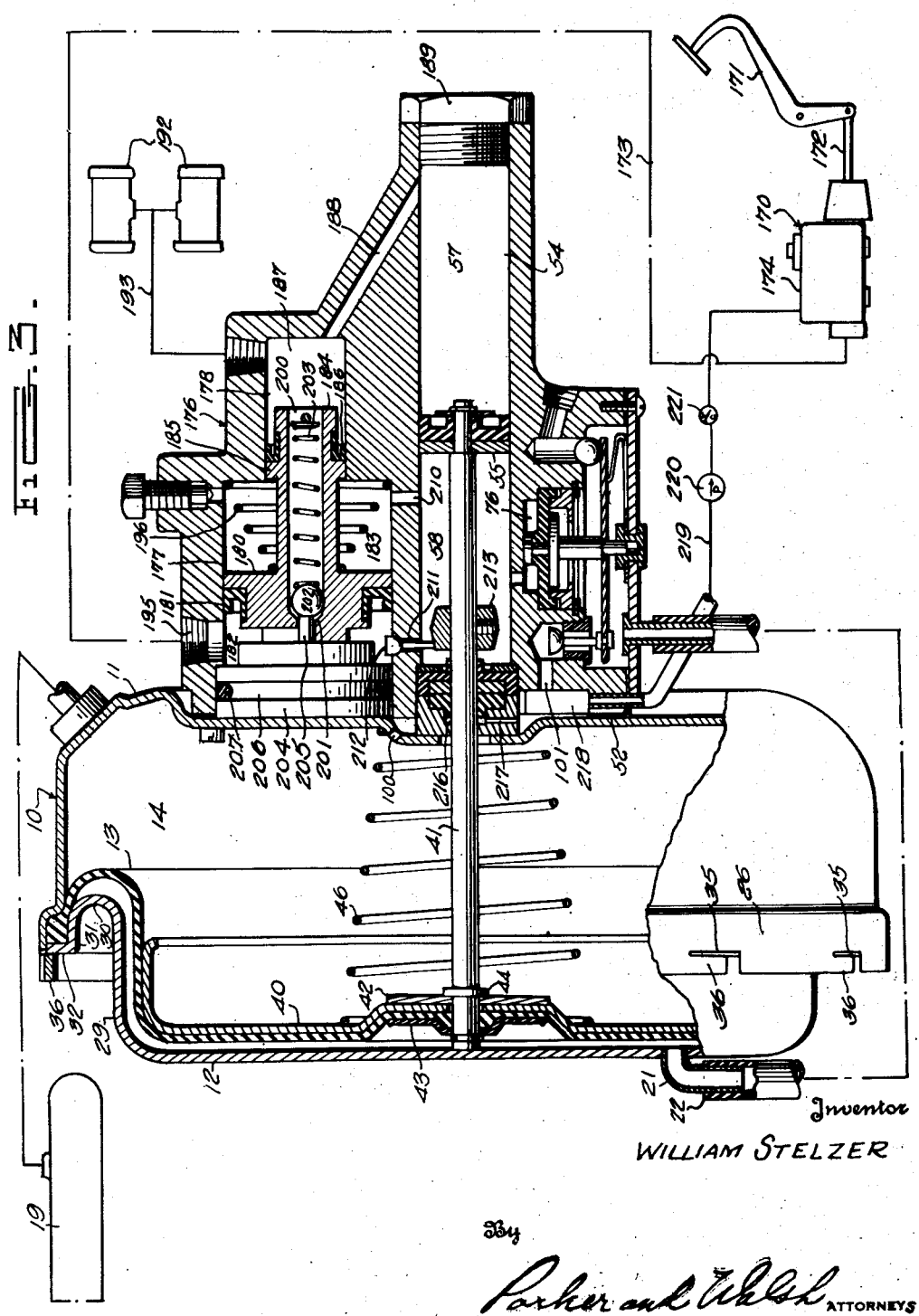
Inventor
WILLIAM STELZER
By
Parker and Walsh ATTORNEYS Patented Nov. 10, 1953

2,658,348

UNITED STATES PATENT OFFICE 2,658,348

BOOSTER BRAKE MECHANISM

William Stelzer, Summit, N. J.

Application March 22, 1950, Serial No. 151,119

11 Claims. (Cl. 60—54.5)

This invention relates to a hydraulic booster brake mechanism.

In the now commonly employed booster brake mechanisms, a fluid pressure motor is utilized to assist the operator in generating relatively high hydraulic pressure for applying the brakes. The motor partakes of a follow-up action relative to displacement of fluid from the master cylinder by the operator, and this follow-up action is accomplished in the prior art in either of two ways, namely, by hydraulic pressures developed by the operator, or by mechanical movement of some part actuated as a result of operation of the brake pedal.

Prior devices of the character referred to have been found to be practicable, but the follow-up action of the fluid pressure motor leaves much to be desired in the way of smoothness and accuracy. Moreover, the brake applying pressures developed by prior constructions have been higher than the pressure developed manually by the operator, and any fluctuation in the braking pressure due to even minor inaccuracies in the follow-up action of the booster motor has reacted through the manually operated parts of the mechanism to be felt by the foot of the operator.

It is well known that master cylinder piston diameters are compromises due to the fact that the displacement of the manually operable master cylinder piston cannot be sufficiently great to provide the volume of fluid necessary for moving the brake shoes into engagement with the drums and at the same time provide the degree of pressure necessary for full brake application.

An important object of the present invention is to provide a novel booster motor follow-up control mechanism which functions in accordance with the volume of fluid displaced manually by the operator in a novel manner, instead of depending upon pressure fluctuations or distance of movement of a manually operable part, thus providing a more accurate follow-up action.

A further object is to provide such a mechanism wherein the operator in depressing the brake pedal performs two functions, namely to displace fluid at high pressure for brake application and to displace fluid at negligible pressure to provide the volume of fluid necessary for operating the booster motor mechanism, which functions to provide the substantial volume of fluid necessary for moving the brake shoes into engagement with the drums, thus permitting the use of a small operator-actuated piston for developing high braking pressures without the use of substantial force on the brake pedal.

A further object is to provide a brake mechanism of the character referred to wherein the maximum braking pressure is the pressure developed by the operator, thus eliminating the subjection of the manually operable parts to pressures which are substantially higher than the manually generated pressures, by reason of which fluctuations in brake pressures in prior mechanisms have reacted to the brake pedal, thus materially affecting the smoothness of operation of mechanisms of this character.

A further object is to provide such an apparatus wherein the dual fluid displacement effected by operation of the brake pedal does not add to the work which must be performed by the operator, and wherein such dual displacement may be accomplished by a particular type of master cylinder construction, or by a conventional master cylinder with the means built into the booster unit for effecting the manually controlled movement of fluid for operating the valve mechanism.

Other objects and advantages of the invention will become apparent during the course of the following description.

In the drawings, I have shown two embodiments of the invention. In this showing, Figure 1 is an axial sectional view through the booster unit, the vacuum source, wheel cylinders and master cylinder being diagrammatically represented together with the piping connections associated therewith, Figure 2 is an enlarged central vertical sectional view through the special master cylinder used in connection with the booster unit shown in Figure 1, Figure 3 is a sectional view similar to Figure 1 showing a modified form of the invention for use in conjunction with a conventional master cylinder as illustrated, a portion of the booster casing structure being shown in elevation, Figure 4 is an enlarged detailed sectional view on line 4—4 of Figure 1, and Figure 5 is an enlarged fragmentary face view of a portion of the casing structure.

Referring to Figure 1, the numeral 10 designates the booster motor as a whole comprising casing sections 11 and 12 having a diaphragm 13 clamped therebetween in a manner to be described to form a constant pressure chamber 14 and a variable pressure chamber 15. The casing section 11 is provided with a nipple 17 for connection with a pipe line 18 leading to a source of vacuum, preferably the intake manifold 19 of the vehicle engine. The casing section 12 is provided with a connection 21 to which is attached a pipe 22 through which pressures in the chamber 15 are controlled in a manner to be described.

The casing section 11 adjacent its free edge is flared outwardly as at 25 to form a shoulder beyond which the casing section is substantially cylindrical as at 26. The diaphragm 13 is provided with a peripheral bead 27 seating against the shoulder 25. The casing section 12 is provided with a cylindrical portion 29 and at the inner extremity of such portion, the casing section 12 turns outwardly as at 30 and then extends cylindrically as at 31 to form a casing portion lying within and contacting with the bead 27. At its periphery, the casing section 12 is provided with an outstanding annular flange 32 lying against the edge of the bead 27.

At spaced points therearound, the casing portion 26 is angularly slotted as at 35 to provide circumferentially extending lips 36. After the parts are assembled in the positions shown in Figure 1 (and in Figure 3 referred to below) the free ends of the lips 36 are bent inwardly slightly to act as retainers for the casing section 12, these lips engaging the annular flange 32. As will become apparent below, the pressure in the chamber 15 never exceeds the atmospheric pressure against the outer face of the casing section 12, and accordingly the lips 36 act efficiently as retaining means to fix the casing sections and diaphragm relative to each other. Attention is invited to the fact that the lips 36 present their edgewise strength against the flange 32 and thus provide more than adequate strength to retain the parts assembled.

A diaphragm plate 40 is arranged in contact with the body of the diaphragm 13 as shown in Figure 1. This diaphragm is fixed to a piston rod 41 by means of retaining discs 42 and 43, the former of which engages an annular shoulder 44 on the piston rod and the latter of which engages a retaining snap ring 45. The piston rod 41 carries a piston to be referred to later. A spring 46 engages the diaphragm plate 40 to tend to hold it in the normal "off" position shown in Figure 1 and return it to such position when released.

A preferably cast body 50 is arranged adjacent and coaxial with the casing section 11 and is secured thereto by screws 51, a gasket 52 being interposed between the elements as shown. The body 50 is provided therewithin with a cylinder 54 divided by a piston 55 and its seal 56 to form a high pressure chamber 57 and a low pressure control chamber 58. The piston 55 and seal 56 are carried by the piston rod 41. The end of the high pressure end of the cylinder 54 is provided with a plug 60 into which is tapped a pipe line 61. This pipe line, in turn, is tapped into a pipe line 62 leading to the brake cylinders indicated by the numeral 63. These are the conventional brake cylinders of a motor vehicle and need not be illustrated or described in detail.

The piston rod 41 extends through a bearing block 65 and then through a floating bearing 66 flanged on opposite sides by seals 67 and 68, the former of which is seated against a disc 69 engaging a shoulder 70 in the adjacent end of the cylinder 54. These seals 67 and 68 efficiently seal the chamber 58 against leakage of fluid around the piston rod 41 into the motor chamber 14. Attention is invited to the fact that pressure in the chamber 58 is always low, and accordingly there is very little tendency for any leakage to occur.

The chamber 58 communicates through a port 75 with a chamber 76 in which is arranged a diaphragm 77 surrounding the stem 78 of a disc 79. Referring to Figure 4, it will be noted that the diaphragm 77 seats against a shoulder 82 formed at the upper end of a cylindrical opening 83 of larger diameter than the chamber 76. The diaphragm is provided with a downturned edge 84 arranged against the wall of the opening 83. A clamping ring 86 is provided for the diaphragm 77 and is arranged in the cylindrical opening 83 and engages the bottom of the flange 84. The ring 86 is provided with an annular flange 87 lying within and engaging the flange 84. The ring 86 is held in position by a split retaining ring 88. Thus the diaphragm 77 is firmly fixed at its periphery, and the central portion of the diaphragm is movable downwardly under the influence of hydraulic fluid flowing into the chamber 76 through port 75 (Figure 1).

The upper end of the stem 78 is provided with a head 90 engaging the central portion of the diaphragm 77 whereby such central portion is fixed with respect to the stem 78 and disc 79. The disc 79 is provided with a lower depending stem 92 having a reduced lower end 93 forming with the stem 92 a shoulder 94 for a purpose to be described. The lower end of the reduced stem 93 slides in a guide 95 fixed to a bottom plate 96 fixed by screws 97 to the body 50. This body is provided beneath the disc 79 with an enlarged chamber 98 of which the plate 96 forms the bottom wall.

The casing section 11 is ported as at 100 to afford communication between the motor chamber 14 and a passage 101. A ported valve seat 102 is adapted to afford communication between the chamber 98 and passage 101 under the control of a downwardly seating vacuum valve 103. The stem 104 of this valve has loose engagement with one end of a valve operating lever 106, the opposite end of which engages a ball valve 107 normally closing a passage 108 leading to the atmosphere preferably through a conventional air cleaner (not shown). The reduced stem portion 93 (Figure 4) extends loosely through the lever 106. A leaf spring 110 engages the lever 106 substantially closer to the valve 107 than to the valve 103, and the guide 95 serves to anchor one end of the spring 110 as shown in Figures 1 and 4. The spring 110 urges the lever 106 upwardly to normally seat the valve 107 and normally unseat the valve 103. A nipple 112 is fixed to the plate 96 and serves to establish communication between the chamber 98 and the pipe 22. Thus the pressure in the motor chamber 15 is established in accordance with pressures in the chamber 98.

Fluid is supplied to the chamber 58 through a pipe line 115 leading from a special master cylinder indicated as a whole by the numeral 116 and illustrated in detail in Figure 2. This master cylinder comprises a cylinder body 117 having a cylindrical bore 118 therein. A piston 119 is movable in the bore 118 through operation of the conventional rod 120 connected to the brake pedal 121 (Figure 1). The plunger 119 has a seal 123 at its outer end and the plunger is limited in its outward movement by engaging a stop 124 backed up by a snap ring 125.

At its other end, the plunger 119 is provided with an annular flange 128 slidable in the bore 118 and apertured at as 129 for a purpose to be described. The flange 128 engages one side of a seal 130, the opposite side of which engages a small annular flange 131 formed on the plunger 119. The flange 128 and seal 130 divide the bore 118 into a pair of chambers 133 and 134, the former of which communicates with the master cylinder reservoir 135 through a port 136.

A second plunger 138 is arranged in the bore 118 and has a reduced end 139 slidable in a bore 140 formed in the adjacent end of the plunger 119 and communicating with the chamber 133 through a port 141. The reduced plunger end 139 forms on the plunger 138 a shoulder 143. A wave washer 144 is arranged between the shoulder 143 and the adjacent end of the plunger 119 to urge the plungers 119 and 138 in opposite directions for a purpose to be described.

The plunger 138 is provided with an axial passage 148, one end of which is enlarged as at 149 and the other end of which communicates with the chamber 140. A valve plunger 150 is arranged in the enlarged passage portion 149 and has a conical end 151 engageable in the adjacent end of the passage 148.

A hollow plug 153 is threaded in the end of the cylinder body 117 adjacent the valve plunger 150. The inner end of this plug engages a seal 154 backed up by a ring 155 fixed in position by a snap ring 156.

A spring 158 in the plug 153 urges the valve plunger 150 toward closed position. Movement of the valve plunger is limited by engagement of a washer 159 carried thereby, with a snap ring 160. The plug 153 has therein a chamber 162 in which the spring 158 is arranged, and the chamber 162 is ported as at 163 for communication with the pipe line 62 (Figure 1). The chamber 134 is similarly ported as at 165 for communication with the pipe line 115 leading to the control chamber 58. It will become apparent that the relatively small effective area of the plunger 138 operating in the chamber 162 generates a relatively high manually - developed pressure while displacing a relatively small volume of fluid which is insufficient for moving the brake shoes into engagement with the drum. The fluid displaced from the chamber 134 operates the booster motor to supply the necessary additional volume of fluid to the brake cylinders, as described in detail below.

The form of the invention previously described makes use of a special master cylinder for displacing fluid from the chambers 134 and 162 for the purposes generally stated above. The form of the invention shown in Figure 3 is adapted for use with a conventional master cylinder and varies from the form of the apparatus shown in Figure 1 only by the addition of the means added thereto to supply functions corresponding to the operation of the plunger 119 for displacing fluid from the chamber 134 of Figure 2. Only such additional means in Figure 3 need be described, the remaining parts being identical with the parts previously described and indicated by the same reference numerals.

In the form of the invention shown in Figure 3, the numeral 170 designates a conventional master cylinder as a whole, the modified form of the invention being designed for use with such master cylinder. The usual pedal 171, through a rod 172, operates the conventional piston (not shown) to displace fluid through a pipe line 173. The master cylinder includes the usual reservoir 174.

In Figure 3, a different body 176 is employed in place of the body previously described. The motor, plunger and valve mechanism are identical with the corresponding parts previously described and have been indicated by the same reference numerals as in Figure 1. The body 176 is enlarged to provide for a cylinder 177, preferably corresponding in displacement with that of the usual master cylinder. The body 176 further includes a cylinder 178 of smaller diameter for the generation of relatively high pressure, as described below.

A piston 180, provided with a seal 181, is arranged in the cylinder 177 and divides it into a pair of chambers 182 and 183. The piston 180 is provided with a preferably integral cylindrical axial projection 184 having an annular enlargement 185 provided with a seal 186, forming a piston operable in the cylinder 178. The piston 185 provides in the cylinder 178 a chamber 187 which communicates with the chamber 57 through a passage 188. This passage, as will become apparent, corresponds to the pipe 61 (Figure 1) previously described, and in view of the elimination of this pipe, the end of the cylinder 54 is plugged as at 189. The chamber 187 communicates with the wheel cylinders 192 through a suitable pipe line 193.

The pipe 173, connected to the master cylinder 170, leads to a port 195 and communicates therethrough with the chamber 182 for the flow of fluid into such chamber to move the piston 180 to the right as viewed in Figure 3. A return spring 196 urges the piston 180 toward the left, thus tending to keep this piston in the normal position shown in Figure 3.

As previously stated, the axial projection 184 is substantially cylindrical, being provided with an axial passage 200 reduced at the left hand end, as viewed in Figure 3, to form a valve seat 201 engageable by a ball valve 202 urged toward closed position by a spring 203 which is weaker than the spring 196. A plug 204 in the cylinder 177 limits movement of the piston 180 to normal position and is provided with an axial projection 205 to unseat the ball 202 when the parts are in "off" position. The plug 204 is grooved as at 206 to receive an O-ring 207 to seal the plug 204 against leakage. The plug 204 seats against the adjacent wall of the casing section 11 to be held in position thereby when the parts are assembled.

The valve mechanism in Figure 3 may be identical with that described in connection with Figure 1. To supply to the chamber 58 and thus to the chamber 76 the fluid necessary for operating the valve mechanism, a port 210 communicates between the chambers 58 and 183. To normally balance pressures between chambers 58 and 182 when the parts are in the "off" position shown, these chambers are adapted to communicate with each other through a port 211 adapted to be closed by a valve 212. A small cam 213, adjustable on the piston rod 41, is adapted to slightly unseat the valve 212 when the movable parts of the fluid pressure motor reach the fully "off" positions.

The piston 55 and seal 56, when the apparatus is in operation, are subject to relatively high pressures in the chamber 57 and to relatively lower pressures in the chamber 58. Accordingly, pressure differentials exist on opposite sides of the motor-operated piston and very slight leakage will occur past the piston. Since the piston is not subjected at one side to substantial hydraulic pressures and at its opposite side to vacuum in the chamber 14, the leakage necessarily will be very slight, and the loss of fluid into the vacuum chamber 14 is further reduced by means of the seals 67 and 68. However, any fluid leaking past the seals 67 and 68 may be recovered and returned to the reservoir 174. For this purpose, a small chamber 216 is provided adjacent the seal 68, and any fluid leaking into this chamber will drain therefrom by gravity through a small passage 217. The passage 101 described in connection with Figure 1 is provided in Figure 3 with a downwardly recessed chamber 218 into which the leakage fluid from passage 217 will find its way. The chamber 218 is connected to the reservoir 174 by a pipe 219 in which is interposed a small pump 220 and a check valve 221.

Operation

The form of booster unit shown in Figure 1 is used in connection with the special type of master cylinder illustrated in Figure 2. The parts normally occupy the positions shown in Figures 1 and 2. When the brakes are to be applied, the operator depresses the pedal 121 (Figure 1) to move the reciprocable parts in Figure 2 toward the right. The piston 128 and seal 130 displace fluid from the chamber 134 through port 165 into the primary or low pressure chamber 58 (Figure 1). At the same time, the plunger 138 displaces fluid from the chamber 162 by moving thereinto. The fluid thus displaced flows through port 163 and thence through pipe line 62 to the brake cylinders. At this point, attention is invited to the fact that the arrangement referred to provides two manually operated fluid displacing means. As will become apparent, fluid from the chamber 134 meets a very low degree of resistance and accordingly remains at low pressure, thus in itself offering little resistance to movement of the brake pedal. The plunger 138 being of relatively small diameter, the operator may, without great effort, develop a relatively high pressure in the chamber 162, brake lines 62 and brake cylinders 63. The small plunger 138 is capable of developing relatively high pressure, as stated. Conversely, this plunger is incapable of displacing fluid in sufficient quantity, within the limits of its travel, to effect movement of the brake shoes into engagement with the drums and to apply the brakes fully. The additional fluid required for this purpose is supplied from the chamber 57 (Figure 1) through pipe 61 through the operation of the fluid pressure operated motor.

Fluid displaced from the low pressure chamber 134, flowing through pipe 115, enters chamber 58 and then flows through port 75 into valve control chamber 76 (Figures 1 and 4) to urge the diaphragm 77 and stem 92 downwardly. This action transmits movement to the valve operating lever 106 intermediate the ends thereof, the left hand end of this lever as viewed in Figure 1 moving downwardly while the lever fulcrums on its point of contact with the ball valve 107. Very slight movement of the lever 106 in this manner drops the valve 103 on its seat, thus disconnecting the passage 101 from the chamber 98. When the valve 103 closes, no further downward movement of the left hand end of the lever 106 can occur, and further downward movement of the diaphragm 77 and stem 92 effects downward movement of the right hand end of the lever 106 against the tension of the spring 110 releasing the ball valve 107 from its seat.

The motor 10 is normally vacuum suspended. The chamber 14 is in fixed communication with the intake manifold and also is in constant communication with the passage 101. The valve 107 being normally closed and the valve 103 being normally open, vacuum will be communicated through passage 102, chamber 98 and pipe 22 to the motor chamber 15, thus vacuum suspending the diaphragm 13.

The closing of the valve 103 cuts off communication between the motor chamber 15 and the vacuum chamber 14 and opens communication between the chamber 98 and the atmosphere through passage 108. Thus air is admitted into the motor chamber 15 to move the diaphragm 13 toward the right together with the parts connected thereto. Movement therefore is imparted to the piston 55 to displace fluid from the chamber 57 to lines 61 and 62 into the brake cylinders. This fluid, together with the fluid displaced by the plunger 138 (Figure 2) supplies the necessary quantity of hydraulic fluid for movement of the brake shoes, thus permitting the use of a small plunger 138 through which greater pressure can be developed through the same pedal effort, thus permitting the present device to generate in the chamber 162 the braking pressures to which the wheel cylinders 63 will be subjected.

As the piston 55 moves to the right, the capacity of the chamber 58 will expand, and this operation continues so long as fluid is delivered to the chamber 58 from the master cylinder chamber 134. As soon as movement of the pedal 121 is arrested, no more fluid will flow into chamber 58, and a very slight expansion of the chamber 58 by movement of the piston 55 will result in the return movement of the diaphragm 77 to normal position, or at least to a position in which the ball 107 will be seated to prevent the admission of further air into the motor chamber 15. Thus a perfect follow-up action is provided without the presence of substantial pressures against the parts which operate the valve mechanism, and without operating such mechanism in accordance with relative mechanical movement of the parts. This has been found to be highly advantageous for several reasons. In the first place, the follow-up action is more accurate and instantaneous without noticeable fluctuations in pressure in the pipe lines, and thus the operator is prevented from feeling through his foot the cutting in and out of the booster motor. Moreover, the operator gets a more accurate "feel" at all times since the full braking pressure always reacts on the operator's foot through pressures exerted on the plunger 138. This plunger being substantially smaller than the plungers of conventional master cylinders, pressures may be developed to a relatively high point directly by the operator, who always feels a reaction in exact proportion to brake application.

When the operator releases his foot from the pedal 121, the spring 158, assisted by the pressure of the fluid in the brake lines, will move the plunger 138 and associated elements back to their normal positions as shown in Figure 2. Expansion of the chamber 134 withdraws fluid from the chamber 58 as the piston 55 moves toward the left in Figure 2, the valve mechanism now occupying the normal motor-deenergizing position. The chamber 98 will be cut off from communication with the atmosphere by the closing of the ball valve 107, while the motor chamber 15 will be placed in its normal communication with the motor chamber 14 past valve 103. Movement of the motor parts to "off" positions will be accomplished by spring 46 and pressures acting against the piston 55 by fluid in chamber 57.

The plunger 119 is liimted in its movement to "off" position by the stop ring 124. When such "off" position is reached, the valve 151 will be closed with the disc 159 engaging snap ring 160. The engagement of the latter two elements does not provide a completely leak-proof joint. The closing of the valve 151, however, prevents fluid leaking past elements 159 and 160 from entering the passage 148 and thus returning to the reservoir 135. Accordingly, the proper residual pressure is maintained in the brake lines.

If, through expansion, pressure in the brakes should increase, the increased pressure will act on the right hand end of plunger 138 to move it slightly toward the left in Figure 2 against the tension of the wave washer 144. Since the valve 151 remains stationary, fluid will leak into the passage 148 until pressure in the chamber 162 drops to the desired residual pressure. The washer 144 will then urge the plunger 138 toward the right the slight distance necessary to close the valve 151. Fluid from the reservoir may leak through port 129 toward the right in Figure 2 around seal 130 to satisfy any fluid deficiency in the chamber 134, and fluid may leak in the same manner and for the same purpose toward the right around seal 154 into chamber 162.

The form of the invention shown in Figure 3 is intended for use with a conventional master cylinder as diagrammatically represented by the numeral 170. The master cylinder has the usual piston which displaces fluid upon operation of the brake pedal, and this fluid flows through line 173 into chamber 182 to move the pistons 180 and 185. Here again is provided a pair of pistons, one of small area (185) to develop braking pressures, and the other a large piston (180) to displace fluid for the purpose of operating the control valve mechanism for the fluid pressure motor. The fluid in the line 173 and chamber 182 thus forms, in effect, a hydraulic link between the master cylinder and the dual piston fluid displacing means, such means therefore comprising a manually operable mechanism in the same manner that this is true of the plungers 138 and 128 (Figure 2).

Fluid moving into the chamber 182 operates the pistons 180 and 185, the latter of which, because of its relatively small area, displaces a relatively small volume of fluid at relatively high pressure from the chamber 187 into the brake cylinders. The insufficient quantity of brake fluid thus provided for moving the brake shoes is made up, as in the previous case, by fluid from the chamber 57.

Movement of the piston 180 displaces fluid from chamber 183 through port 210 into chamber 58 and thence into the valve operating chamber 76 to operate the valve mechanism in the manner previously described. Energization of the motor 10 displaces fluid from chamber 57 through passage 188 into chamber 187 and thence through line 193 to the brake cylinders 192. The chambers 57 and 187 thus communicate with each other and with the brake cylinders to supply hydraulic fluid thereto, the piston 55 making up the lack in volume displaced by piston 185, the piston 185 being manually operated to determine the effective braking pressure of the fluid in the brake cylinders 192. Accordingly, the apparatus in Figure 3 performs exactly the same functions as the apparatus in Figures 1 and 2.

The follow-up action of the valve mechanism is identical with that previously described and possesses the same advantages. The brakes are released by releasing the pedal 171, the master cylinder parts returning to normal position in the usual manner and the spring 196 returning the pistons 180 and 185 to their "off" positions. When the piston 180 approaches its normal position, the pin or stud 205 unseats the ball 202 against the tension of the spring 203, this spring being weaker than the spring 196, as will be apparent. When the parts are in the "off" positions, therefore, the chambers 182 and 187 communicate with each other, thus establishing communication between the brake cylinders 192 and the master cylinder 170 whereby the residual pressure valve of the master cylinder retains the desired pressure throughout the system from the master cylinder to the wheel cylinders.

The diaphragm 13 and associated elements return to normal positions in the same manner as in Figure 1. As the piston rod 41 approaches normal position, the cam 213 slightly lifts valve 212, thus establishing restricted communication between chambers 58 and 182 to maintain balanced pressures therein under all conditions when the brake is not in operation.

Leakage of fluid into the chamber 216 will be extremely slight. Any such fluid, however, will drip downwardly through passage 217 into chamber 218 to be returned to the reservoir 174. Pressure in the reservoir will be that of the atmosphere, while vacuum prevails at all times in the chamber 218. Thus the check valve 221 is provided, and if the parts are so located that the inertia of any brake fluid in the pipe 219 will open the check valve 221 sufficiently for the fluid to pass on into the reservoir, the pump 220 need not be employed. Otherwise, the use of the small pump 220 is necessary for returning leakage fluid to the reservoir.

The casing structure, including the securing lips 36, is highly advantageous. In devices of this character, the two casing sections usually are secured with respect to each other and against opposite sides of a peripheral diaphragm bead by means of a split clamping band. The present construction eliminates the use of the clamping band and permits the motor to be easily and quickly assembled. It merely is necessary to slip the diaphragm bead 27 over the casing flange 31, and then move the two casings into the operative position shown. A pair of pliers then may be employed for bending the lips 36 inwardly to a slight extent over the flange 32. The elements are then securely fixed to each other, and the edgewise rigidity of the lips 36 eliminates any possibility that the casing sections may become disengaged. If necessary for disassembling the motor, the lips 36 need be merely bent slightly outwardly to clear the flange 32 whereupon the casing section 12 may be removed.

I claim:

1. In a braking system having wheel cylinders to apply brakes, means operated by manual power to transmit hydraulic fluid directly to the wheel cylinders to apply the brakes, a booster comprising fluid displacing means, a power operated motor mechanism connected to said fluid displacing means to operate it and force hydraulic fluid to said wheel cylinders to augment the amount of fluid transmitted by said means operated by manual power, low pressure fluid displacing means connected to and operable in unison with and by said means operated by manual power to transmit a proportionate volume of control fluid, means comprising a control chamber, in said booster to receive said volume of control fluid, and follow-up control means responsive to the volume of control fluid in said control chamber to control the power of said motor mechanism to provide a follow-up action of said fluid displacing means with said means operated by manual power to augment the fluid transmitted to the wheel cylinders in proportion to the fluid transmitted thereto by said means operated by manual power.

2. In a braking system having wheel cylinders to apply the brakes, a pair of connected simultaneously manually operable fluid displacing devices one of which is connected to the wheel cylinders to apply the brakes, a fluid displacing mechanism connected to the wheel cylinders to augment the amount of fluid transmitted thereto by said one fluid displacing device, a differential fluid pressure operated motor connected to said fluid displacing mechanism, a valve mechanism normally biased to deenergize said motor, an expansible chamber device, comprising a control chamber, connected to said valve mechanism, means establishing communication between said control chamber device and the other of said fluid displacing devices whereby fluid displaced from the latter device expands the volume of said control chamber and energizes said motor, and means operable by said motor for expanding said fluid communication means to reduce the volume of said control chamber to tend to prevent a motor-energizing operation of said expansible chamber device whereby said motor is caused to operate said fluid displacing mechanism in a follow-up action relative to said one fluid displacing device.

3. In a braking system having wheel cylinders to apply the brakes, a pair of connected simultaneously manually operable fluid displacing devices one of which is connected to the wheel cylinders to apply the brakes, a cylinder, a piston in said cylinder dividing it into a control chamber and a high pressure chamber, the latter of which communicates with the wheel cylinders to augment the amount of fluid transmitted thereto by said one fluid displacing device, a power device connected to said piston, control means for said power device normally biased to deenergize said power device, said control means comprising an expansible chamber communicating with said control chamber and expansible to energize said power device, and means establishing communication between the other of said fluid displacing devices and said control chamber, said control chamber expanding upon energization of said power device to tend to prevent expansion of said expansible chamber.

4. In a braking system having wheel cylinders to apply the brakes, a pair of connected simultaneously manually operable fluid displacing devices one of which is connected to the wheel cylinders to apply the brakes, a cylinder, a piston in said cylinder dividing it into a control chamber and a high pressure chamber, the latter of which communicates with the wheel cylinders to augment the amount of fluid transmitted thereto by said one fluid displacing device, a differential fluid pressure operated motor connected to said piston, a control valve mechanism for said motor normally biased to deenergize said motor, an expansible chamber device communicating with said control chamber and expansible to operate said valve mechanism and energize said motor, and means communicating between said control chamber and the other of said fluid displacing devices, said control chamber expanding during energization of said motor to tend to prevent expansion of said expansible chamber device.

5. In a braking system having wheel cylinders to apply the brakes, a master cylinder comprising a larger cylinder and a smaller cylinder, a larger plunger and a smaller plunger operable respectively in said larger and smaller cylinders, said plungers having fixed mechanical connection with each other and being manually operable, said smaller cylinder being directly connected to the wheel cylinders to apply the brakes, a fluid displacing mechanism communicating with the wheel cylinders to augment the amount of fluid transmitted thereto from said smaller cylinder, a power device for operating said fluid displacing mechanism, and means operable by fluid displaced from said larger cylinder for controlling said power device.

6. In a braking system having wheel cylinders to apply the brakes, a master cylinder comprising a larger cylinder and a smaller cylinder, a larger plunger and a smaller plunger operable respectively in said larger and smaller cylinders, said plungers having fixed mechanical connection with each other and being manually operable, said smaller cylinder being connected to the wheel cylinders to apply the brakes, a cylinder, a piston in such cylinder dividing it into a high pressure chamber and a control chamber, said high pressure chamber communicating with the wheel cylinders to augment the amount of fluid transmitted thereto from said smaller cylinder, a fluid pressure operated motor connected to said piston and energizable to displace fluid from said high pressure chamber and increase the capacity of said control chamber, a control valve mechanism for said motor, an expansible chamber device connected to said valve mechanism and expansible to energize said motor, said expansible chamber device communicating with said control chamber, and means for connecting said larger cylinder to said control chamber.

7. Apparatus constructed in accordance with claim 6 wherein said larger and smaller plungers are in axial alignment and are axially relatively movable, resilient means urging said plungers away from each other, a reservoir communicating with said larger cylinder, said smaller plunger having an axial passage therethrough from said larger cylinder to said smaller cylinder, and a valve seating in the end of said axial passage communicating with said smaller cylinder when said smaller plunger is in its "off" position, said valve being mounted to travel with said smaller plunger.

8. In a braking system having wheel cylinders to apply the brakes, a manually operable master cylinder, a booster mechanism comprising a booster cylinder, a piston therein dividing it into a high pressure chamber and a control chamber, a second cylinder, an actuating piston in said cylinder dividing it into an inlet chamber and a low pressure chamber the latter of which communicates with said control chamber, said master cylinder communicating with said inlet chamber whereby fluid displaced into such chamber from the master cylinder moves said actuating piston to displace fluid into said control chamber, a relatively small cylinder in axial alignment with said second cylinder, a relatively small plunger in said relatively small cylinder connected to said actuating piston, said relatively small cylinder communicating with the wheel cylinders and with said high pressure chamber, a power device connected to the piston in said booster cylinder, and a control mechanism for said power device comprising an expansible chamber device communicating with said low pressure chamber and expansible to energize said power device.

9. In a braking system having wheel cylinders to apply the brakes, a manually operable master cylinder, a booster mechanism comprising a booster cylinder, a piston therein dividing it into a high pressure chamber and a control chamber, a second cylinder, an actuating piston in said cylinder dividing it into an inlet chamber and a low pressure chamber the latter of which communicates with said control chamber, said master cylinder communicating with said inlet chamber whereby fluid displaced into such chamber from the master cylinder moves said actuating piston to displace fluid into said control chamber, a relatively small cylinder in axial alignment with said second cylinder, a relatively small plunger in said relatively small cylinder connected to said actuating piston, said relatively small cylinder communicating with the wheel cylinders and with said high pressure chamber, a fluid pressure operated motor connected to the piston in said booster cylinder, a control valve mechanism for said motor biased to deenergize said motor, and an expansible chamber device connected to said valve mechanism and communicating with said low pressure chamber to be expanded by fluid therefrom to energize said motor.

10. Apparatus constructed in accordance with claim 9 wherein said actuating piston and said relatively small plunger are provided with a passage communicating between said inlet chamber and said relatively small cylinder, a valve in said passage biased to closed position to cut off communication therethrough, and means engaging said valve when said actuating piston is in "off" position for opening said valve.

11. Apparatus constructed in accordance with claim 9 provided with a port connected between said inlet chamber and said control chamber, a valve normally closing said port, and means operable by said fluid pressure motor when the latter is in its "off" position for opening said valve.

WILLIAM STELZER.

References Cited in the file of this patent

UNITED STATES PATENTS

| Number | Name | Date |
|---|---|---|
| 1,834,368 | Arbuckle | Dec. 1, 1931 |
| 2,057,707 | Carroll | Oct. 20, 1936 |
| 2,115,438 | Wolf | Apr. 26, 1938 |
| 2,206,976 | Rossmann | July 9, 1940 |
| 2,322,063 | Schnell | June 15, 1943 |
| 2,328,637 | Freeman | Sept. 7, 1943 |
| 2,352,357 | Almond | June 27, 1944 |
| 2,353,755 | Price | July 18, 1944 |
| 2,429,195 | Price | Oct. 14, 1947 |

FOREIGN PATENTS

| Number | Country | Date |
|---|---|---|
| 835,760 | France | Oct. 3, 1938 |